United States Patent
Dudley et al.

(10) Patent No.: US 7,886,077 B2
(45) Date of Patent: Feb. 8, 2011

(54) INTERMEDIARY SYSTEM FOR INTERCONNECTING MULTIPLE IMS NETWORKS

(75) Inventors: William H. Dudley, Lovettsville, VA (US); Robert C. Lovell, Jr., Leesburg, VA (US)

(73) Assignee: Sybase 365, Inc., Reston, VA (US)

( * ) Notice: Subject to any disclaimer, the term of this patent is extended or adjusted under 35 U.S.C. 154(b) by 245 days.

(21) Appl. No.: 12/112,187

(22) Filed: Apr. 30, 2008

(65) Prior Publication Data

US 2008/0276003 A1 Nov. 6, 2008

Related U.S. Application Data

(60) Provisional application No. 60/915,730, filed on May 3, 2007.

(51) Int. Cl.
*G06F 15/173* (2006.01)
(52) U.S. Cl. ...................................................... 709/238
(58) Field of Classification Search ................. 709/238, 709/239, 240, 241, 242, 243, 244, 203, 249; 455/406, 415, 453; 370/401, 392
See application file for complete search history.

(56) References Cited

U.S. PATENT DOCUMENTS

| | | | |
|---|---|---|---|
| 7,154,901 B2 | 12/2006 | Chava et al. | |
| 7,203,507 B2 | 4/2007 | Smith et al. | |
| 2007/0076857 A1 | 4/2007 | Chava et al. | |
| 2008/0263137 A1* | 10/2008 | Pattison et al. | 709/203 |
| 2008/0280623 A1* | 11/2008 | Danne et al. | 455/453 |
| 2009/0010271 A1* | 1/2009 | Bachmann et al. | 370/401 |
| 2009/0180476 A1* | 7/2009 | Lee et al. | 370/392 |
| 2009/0264112 A1* | 10/2009 | De Zen et al. | 455/415 |
| 2009/0274090 A1* | 11/2009 | Akhtar et al. | 370/328 |
| 2009/0305662 A1* | 12/2009 | Ala-Luukko et al. | 455/406 |

OTHER PUBLICATIONS

PCT International Search Report and Written Opinion in counterpart International Application No. PCT/US08/62142, dated Jul. 17, 2008.

* cited by examiner

*Primary Examiner*—Le Luu
(74) *Attorney, Agent, or Firm*—Edell, Shapiro & Finnan, LLC

(57) ABSTRACT

An intermediary infrastructure that facilitates the interconnection of multiple IP Multimedia Subsystem (IMS) networks. The interconnections may span one or more of the IMS logical planes Services Plane, Control Plane, and Network or Transport Plane. The intermediary offers among other things a process, routing, and switching complex that is able to among other things process incoming messages including using a comprehensive routing repository to complete message routing operations.

26 Claims, 7 Drawing Sheets

… (US 7,886,077 B2)

INTERMEDIARY SYSTEM FOR INTERCONNECTING MULTIPLE IMS NETWORKS

This application claims the benefit of U.S. Provisional Patent Application No. 60/915,730, filed on May 3, 2007, which is herein incorporated by reference in its entirety.

BACKGROUND

1. Field of the Invention

The present invention relates generally to telecommunications services. More particularly, the present invention relates to capabilities that enhance substantially the value and usefulness of various messaging paradigms including, inter alia, IP Multimedia Subsystem (IMS).

2. Background of the Invention

As the 'wireless revolution' continues to march forward the importance to a Mobile Subscriber (MS), for example a user of a Wireless Device (WD) such as a mobile telephone, a BlackBerry, etc. that is serviced by a Wireless Carrier (WC), of their WD grows substantially.

One consequence of such a growing importance is the resulting ubiquitous nature of WDs—i.e., MSs carry them at almost all times and use them for an ever-increasing range of activities.

Coincident with the 'social explosion' of WDs technological advances have yielded, among other things, new communication paradigms such as IMS.

IMS is a standardized Next Generation Networking (NGN) architecture that, among other things, provides a framework for a collapsed mobile and fixed services infrastructure (e.g., a form of Fixed Mobile Convergence [FMC]) in support of, possibly inter alia, the ubiquitous delivery of a wide range of (voice, data, multimedia, etc.) services to end users (such as, among others, MSs).

Descriptions of the architecture, function, etc. of IMS may be found in various of the specification documents from the Third Generation Partnership Project (3GPP) including, for example, Technical Specification 23.228.

The need exists for an infrastructure that allows the full universe of MSs, through their WDs, to seamlessly participate in the new communication environment/paradigm IMS.

SUMMARY OF THE INVENTION

The present invention, aspects of which may be characterized as IMS Exchange or $IMS_X$, provides such capabilities and addresses various of the (not insubstantial) challenges that are associated with same. Among other things $IMS_X$ may:

1) Provide key interoperability capabilities across, among other entities, disparate fixed providers (such as, for example, landline carriers) and WCs.

2) Facilitate the seamless operation of important services such as, possibly inter alia, Session Initiation Protocol (SIP) across multiple networks, platforms, etc.

3) Provide legacy support (thus, as just one possibility, potentially extending the useful life of various elements of a WC's infrastructure, various legacy WDs, etc.).

In one embodiment of the present invention there is provided an intermediary system for interconnecting multiple IP Multimedia Subsystem (IMS) networks. The system includes at least one input unit selectably connectable to a first IMS network from which a message is received, at least one output unit selectably connectable to a second IMS network through which said message can reach a destination address, and a process, routing, and switching (PRS) complex operable to manipulate aspects of, and alter at least a portion of, said message received from said input unit and sent to said output unit. In a preferred embodiment, the PRS complex performs a routing operation based on a destination address of said message.

These and other features of the embodiments of the present invention, along with their attendant advantages, will be more fully appreciated upon a reading of the following detailed description in conjunction with the associated drawings.

It should be understood that these figures depict embodiments of the invention. Variations of these embodiments will be apparent to persons skilled in the relevant art(s) based on the teachings contained herein.

DETAILED DESCRIPTION

Aspects of the present invention build atop, and extend substantively, the concept of a centrally-located, full-featured MICV facility. Reference is made to U.S. Pat. No. 7,154,901 entitled "INTERMEDIARY NETWORK SYSTEM AND METHOD FOR FACILITATING MESSAGE EXCHANGE BETWEEN WIRELESS NETWORKS," and its associated continuations, for a description of a MICV, a summary of various of the services/functions/etc. that are performed by a MICV, and a discussion of the numerous advantages that arise from same.

Figure 1:
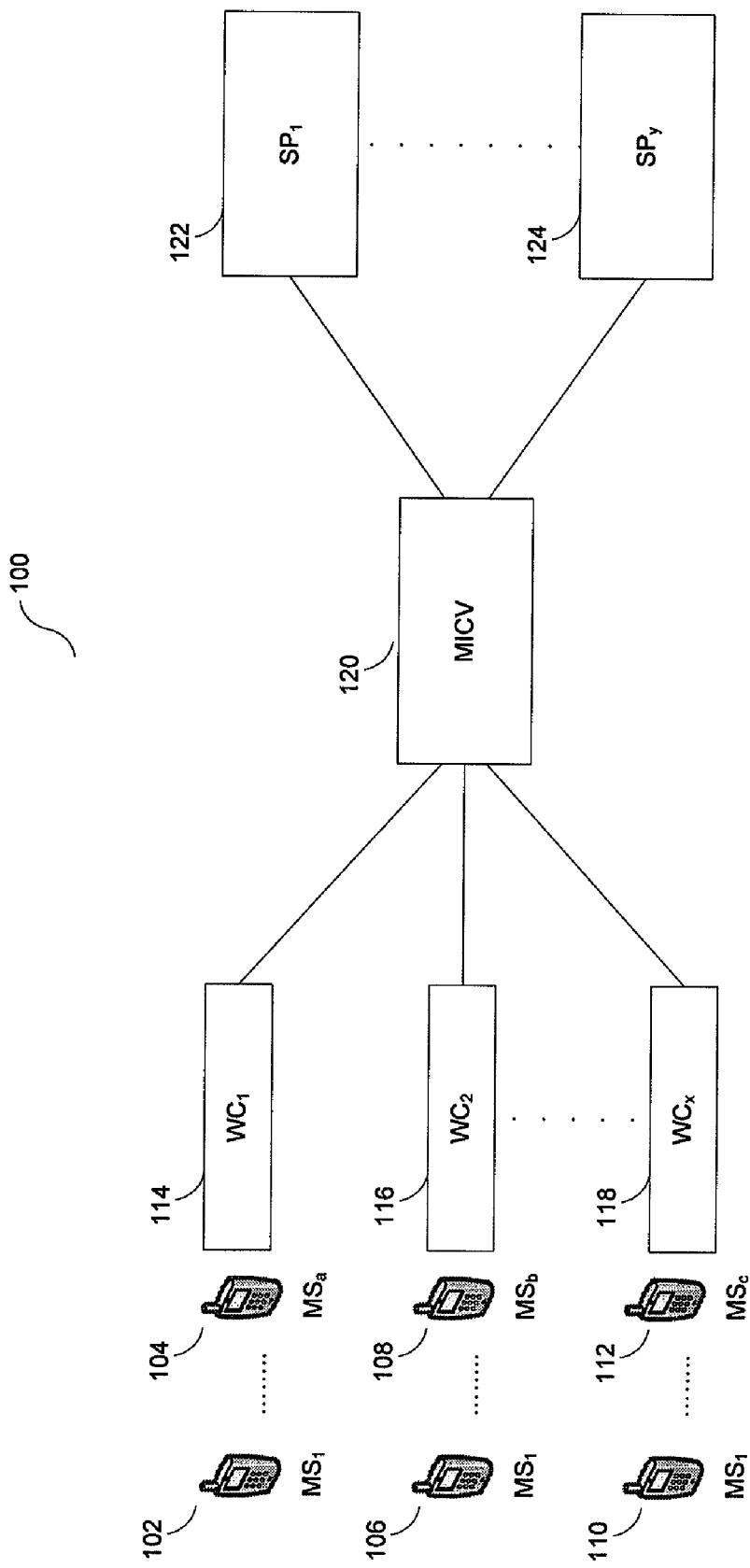
FIG. 1 is a diagrammatic presentation of an exemplary Messaging Inter-Carrier Vendor (MICV).

As depicted in FIG. 1 and reference numeral 100 a MICV 120 may be disposed between, possibly inter alia, multiple WCs ($WC_1$ 114→$WC_x$ 118) on one side and multiple Service Providers (SP, $SP_1$ 122→$SP_y$ 124) on the other side thus 'bridging' all of the connected entities. A MICV 120 thus, as one simple example, may offer various routing, formatting, delivery, value-add, etc. capabilities that provide, possibly inter alia:

1) A WC ($WC_1$ 114→$WC_x$ 118 and, by extension, all of the MSs 102→104, 106→108, 110→112 that are serviced by the WC $WC_1$ 114→$WC_x$ 118) with ubiquitous access to a broad universe of SPs $SP_1$ 122→$SP_y$ 124, and 2) A SP $SP_1$ 122→$SP_y$ 124 with ubiquitous access to a broad universe of WCs ($WC_1$ 114→$WC_x$ 118 and, by extension, to all of the MSs 102→104, 106→108, 110→112 that are serviced by the WCs $WC_1$ 114→$WC_x$ 118).

Generally speaking a MICV may have varying degrees of visibility (e.g., access, etc.) to the (MS ←→MS, MS ←→SP, etc.) messaging traffic:

1) A WC may elect to route just their out-of-network messaging traffic to a MICV. Under this approach the MICV would have visibility (e.g., access, etc.) to just the portion of the WC's messaging traffic that was directed to the MICV by the WC.

2) A WC may elect to route all of their messaging traffic to a MICV. The MICV may, possibly among other things, subsequently return to the WC that portion of the messaging traffic that belongs to (i.e., that is destined for a MS of) the WC. Under this approach the MICV would have visibility (e.g., access, etc.) to all of the WC's messaging traffic.

IMSx extends the concept of a centrally-located, full-featured MICV by abstracting away, and to the extent possible isolating away, all of the complexities, inherent incompatibilities, etc. that are associated with IMS. $IMS_X$ provides, among other things, a single protocol, interface, etc. agnostic access or connection point into which different entities within an IMS ecosystem (for example, possibly inter alia, carriers) may 'plug.'

Figure 2:
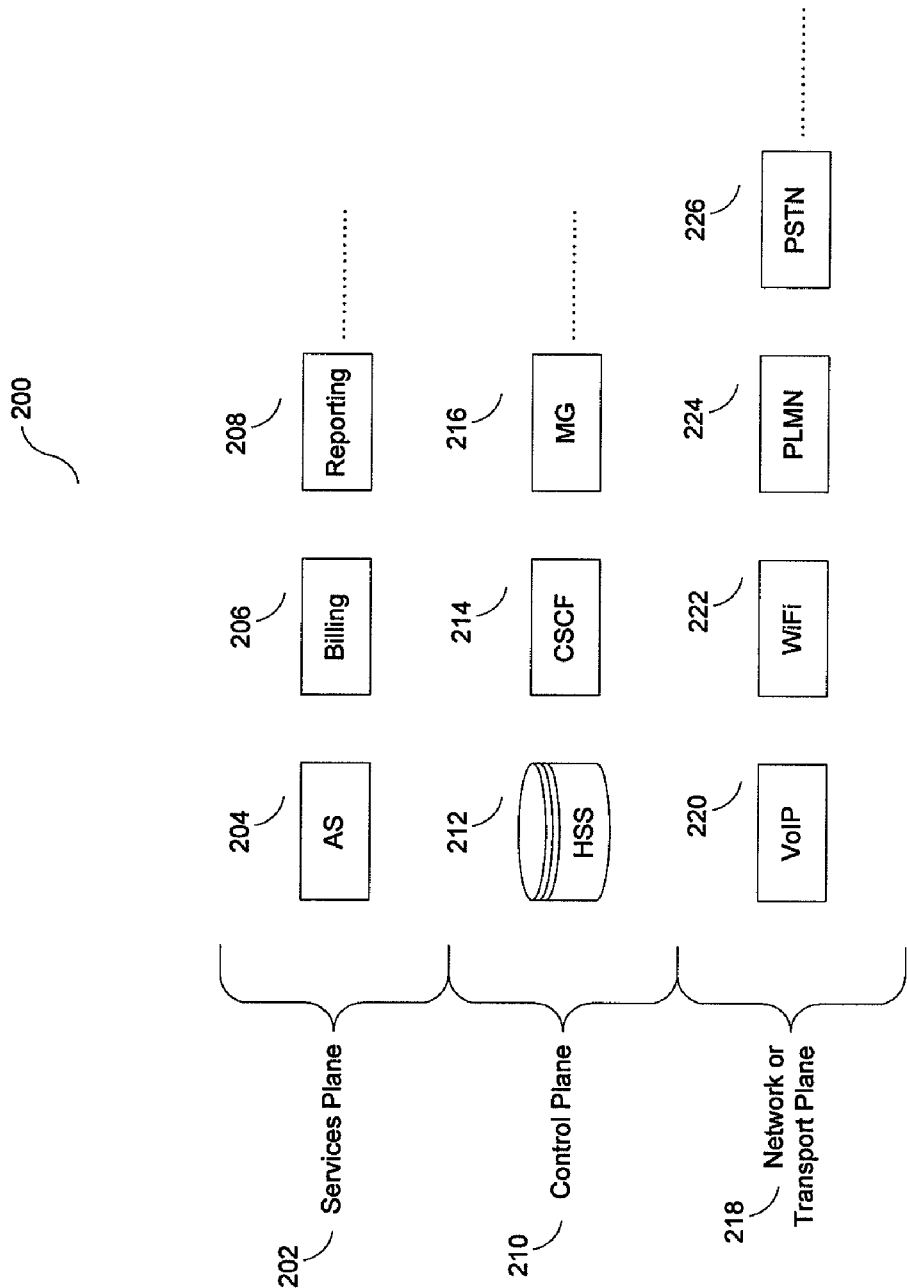
FIG. 2 is a diagrammatic presentation of the three logical IMS planes.

To help illustrate aspects of $IMS_X$'s single access/connection point consider IMS' three logical planes (as illustrated in FIG. 2 and reference numeral 200):

1) Services Plane 202. For example, one or more Application Server (AS) instances 204, Billing facilities 206, Reporting facilities 208, etc.

2) Control Plane 210. For example, a Home Subscriber Server (HSS) capability 212, a Call Session Control Function (CSCF) capability 214, one or more Media Gateway (MG) instances 216, etc.

3) Network or Transport Plane 218. Support, interfaces, etc. for, possibly inter alia, Voice over IP (VoIP) 220, WiFi 222, Public Land Mobile Network (PLMN) 224, Public Switched Telephone Network (PSTN) 226, etc.

Figure 3:
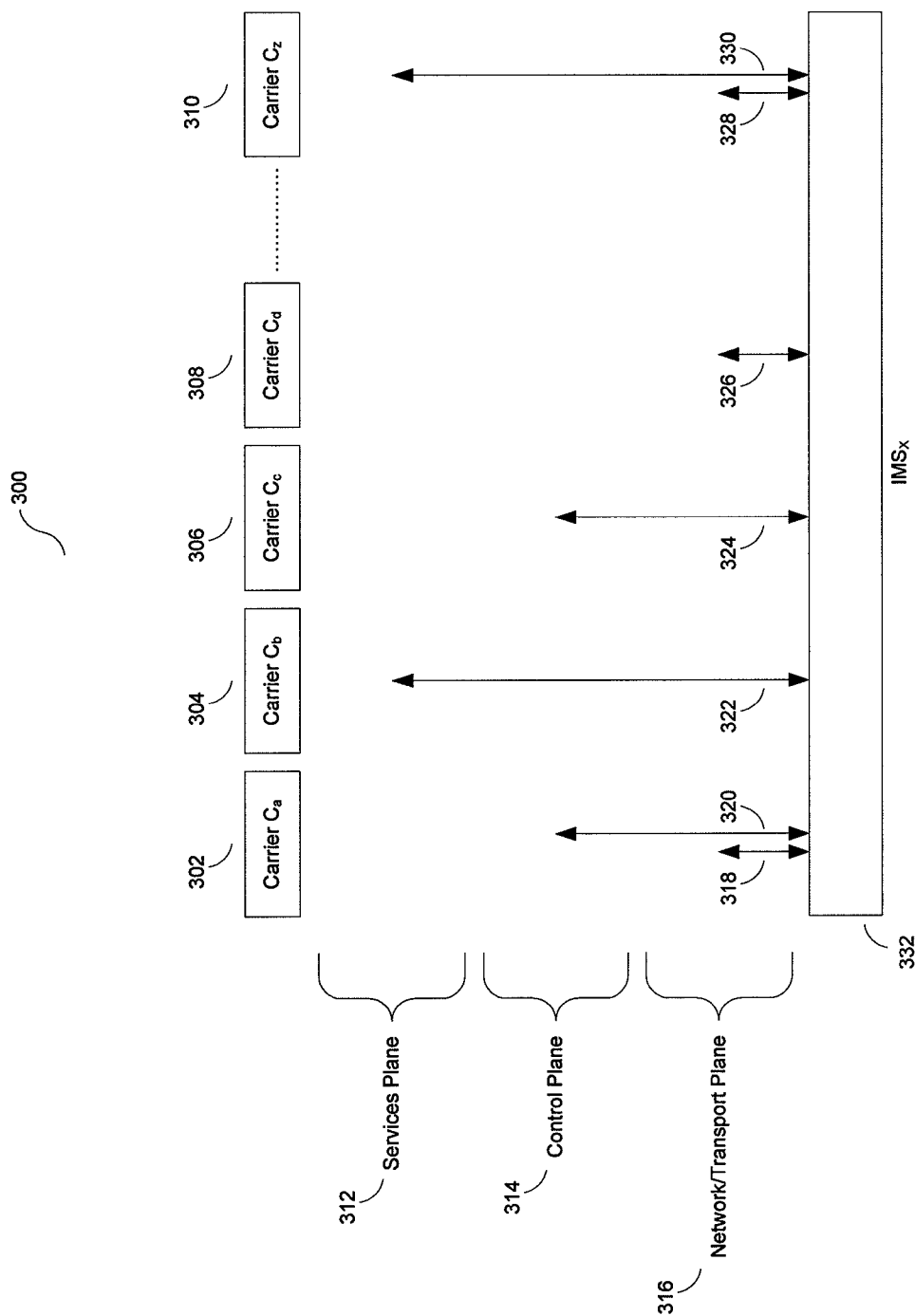
FIG. 3 illustrates exemplary logical connections of multiple carriers to $IMS_X$.

As illustrated in FIG. 3 and reference numeral 300 the different functional elements of an entity (e.g., carriers such as $C_a$ 302→$C_z$ 310, etc.) within an IMS ecosystem may plug in to $IMS_X$'s single access/connection point 332—e.g., elements of carrier $C_a$'s 302 Control Plane and Network or Transport Plane may plug in to $IMS_X$'s single access/connection point 318→320, elements of carrier $C_b$'s 304 Services Plane may plug into $IMS_X$'s single access/connection point 322. Similar access points may be realized at 324→330.

Figure 4:
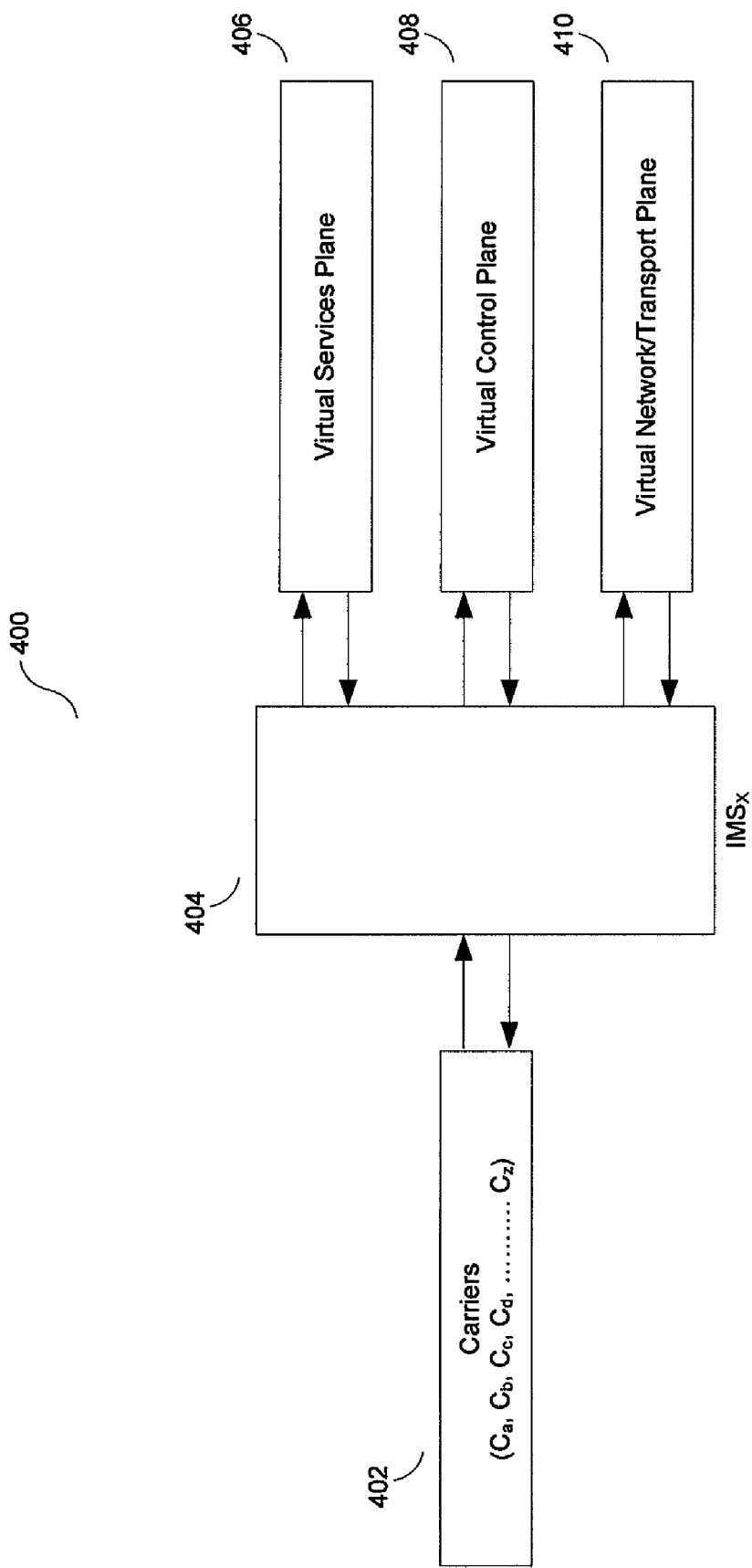
FIG. 4 is a diagrammatic presentation of the virtual implementation of the three logical IMS planes within $IMS_X$.

As illustrated in FIG. 4 and reference numeral 400 the single access/connection point 404 serves much like a façade, behind which connected entities (e.g., carriers such as $C_a$→$C_z$ 402, etc.) may access one or more of the virtual implementations of IMS' logical planes 406→410.

Thus, for example, as a carrier's environment grows and changes, as a carrier's business needs and models change and evolve, as a carrier deploys new service offerings, etc. it can, possibly among other things, plug into (and thus take advantage of the features and functions that are offered by) different combinations of the virtual implementations of IMS' logical planes all through the single access/communication point.

Additionally, placing the virtual planes behind a single façade allows for, possibly among other things, ongoing and dynamic changes, updates, etc. to the physical implementation of a plane without any impact on, or interruptions to, any of the connected entities.

Figure 5:
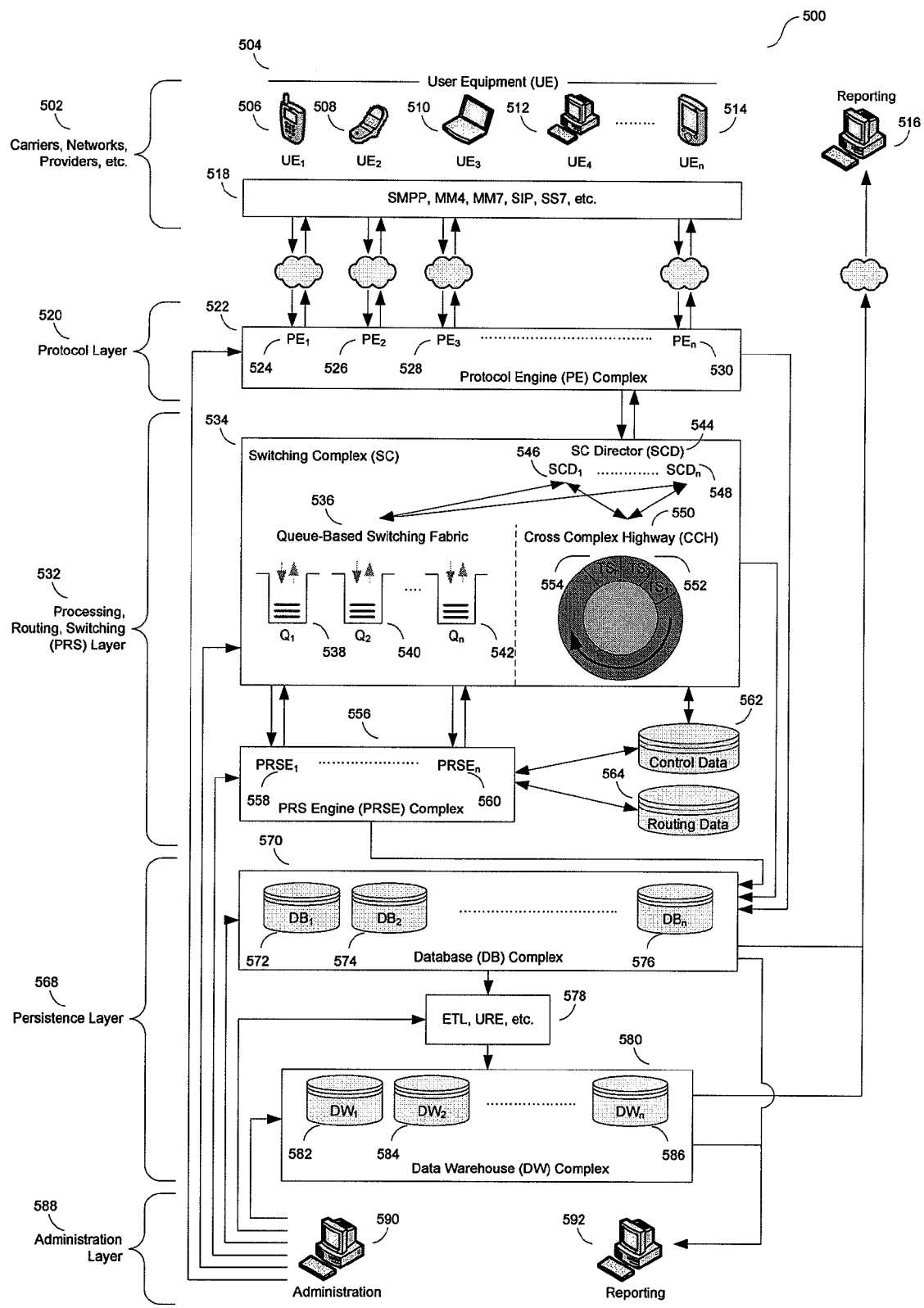
FIG. 5 provides a detailed illustration of aspects of $IMS_X$.

FIG. 5 and reference numeral 500 provides a detailed depiction of various of the important elements of $IMS_X$. Each of the indicated elements may be controlled by, possibly inter alia, a body of flexible, extensible, and dynamically updateable configuration information. The logical layers or tiers that are depicted in the diagram may be summarized and described as:

1) Carriers, Networks, Providers, etc. 502. The full universe of users (such as, possibly inter alia, MSs) of User Equipment (UE) 504-$UE_1$ 506→$UE_n$ 514, such as for example mobile telephones, computers, Blackberrys and PalmPilots, etc.—are supported by carriers, networks, providers, etc. The carriers, networks, providers, etc. 502 may connect to $IMS_X$ (which is shown, generally, below the carriers, networks, providers, etc. layer 502, and which would fit within, e.g., element 404 of FIG. 4) using the single access/ communication point that was described above and then, possibly inter alia, exchange traffic with $IMS_X$ over any combination of a range of communication channels—e.g., Transmission Control Protocol (TCP)/Internet Protocol (IP), User Datagram Protocol (UDP)/IP, Signaling System Number 7 (SS7), etc.—using any combination of a range of protocols—e.g., SIP, Short Message Peer-to-Peer (SMPP), MM4, etc. 518.

2) Protocol 520. A Protocol Engine (PE) Complex 522 may house a dynamically updateable set of one or more PEs ($PE_1$ 524→$PE_n$ 530 in the diagram). A PE may, for example, leverage a body of flexible, extensible, and dynamically updateable configuration information as it completes its tasks, including possibly inter alia:

A) Receiving incoming and sending outgoing traffic using any combination of the supported communication protocols, paradigms, etc.

B) Performing various extraction, validation, editing, formatting, conversion, etc. operations on the elements of an incoming and/or outgoing data stream—e.g., source address, destination address, encoding indicators or flags, payload or body, etc. The specific elements that were just described are illustrative only and it will be readily apparent to one of ordinary skill in the relevant art that numerous other elements are easily possible and indeed are fully within the scope of the present invention.

Figure 6:
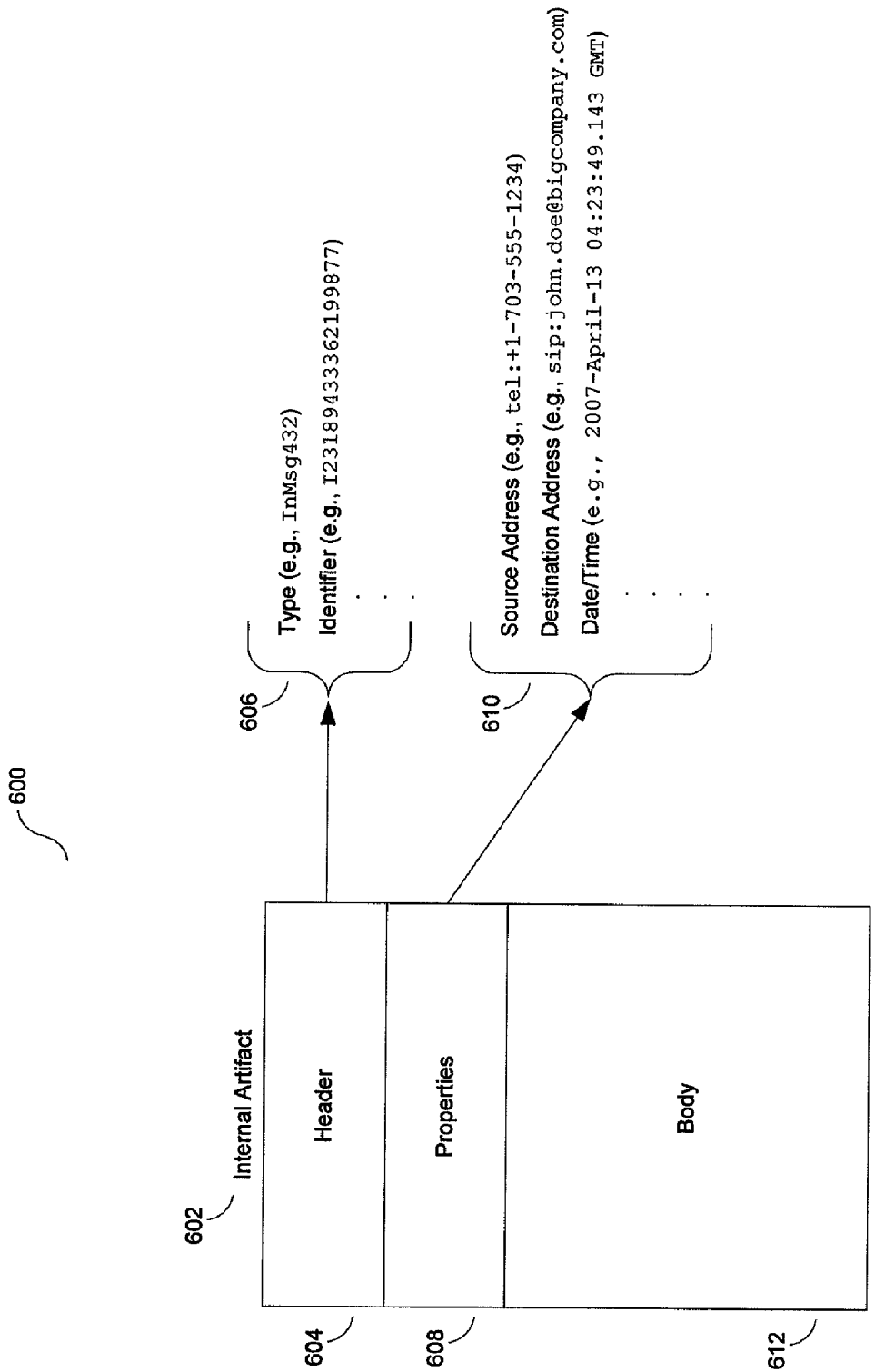
FIG. 6 illustrates an exemplary encapsulation artifact.

C) Encapsulating various elements of an incoming data stream within an internal (i.e., intra—$IMS_X$) artifact and/or un-encapsulating various elements of an outgoing data stream from an internal artifact. An exemplary internal artifact is depicted in FIG. 6 and reference numeral 600. Such an artifact 602 may include a header 604 that includes various information 606, such as a type, or identifier, properties 608 that include other information 610 such as source address, destination address, and/or date/time for a given message, and a body 612 that may contain the contents of the body of an original message.

The catalog of PE processing steps that was described above is illustrative only and it will be readily apparent to one of ordinary skill in the relevant art that numerous other processing steps are easily possible and indeed are fully within the scope of the present invention.

3) Processing, Routing, Switching (PRS) 532. A Switching Complex (SC) 534 may house, possibly inter alia, a dynamically updateable set of one or more SC Directors 544 (SCD, $SCD_1$ 546→$SCD_n$ 548 in the diagram), a dynamically updateable set of one or more Queues 536 ($Q_1$ 538→$Q_n$ 542 in the diagram), and a Cross Complex Highway (CCH) 550.

A dynamically updateable set of one or more Queues (e.g., $Q_1$ 538→$Q_n$ 542) may operate as intermediate or temporary buffers for incoming and outgoing traffic.

A CCH 550 may consist of a rotating 'buffer' containing a configurable number of Time Slots ($TS_0$ 552→$TS_n$ 554 in the diagram) that may be utilized for, possibly inter alia, the rapid redirection of traffic when, for example, no further substantive processing, routing, etc. of that traffic is required. For example, a SCD 544 may deposit incoming traffic that was received from a PE (e.g., $PE_1$ 524→$PE_n$ 530) on to one or more TSs (e.g., $TS_0$ 552→$TS_n$ 554) on a CCH 550 and, as the CCH 550 'rotates' or 'spins', a SCD 544 (e.g., the same SCD or another SCD) may at the appropriate point remove traffic from those TSs (e.g., $TS_0$ 552→$TS_n$ 554) for return to a PE (e.g., $PE_1$ 524→$PE_n$ 530).

A SCD 544 may handle incoming traffic and outgoing traffic and may, possibly inter alia:

A) Selectively deposit incoming traffic (e.g., traffic received from a PE [e.g., $PE_1$ 524→$PE_n$ 530]) on one or more Queues (e.g., $Q_1$ 538→$Q_n$ 542) for subsequent processing by a PRS Engine (PRSE) 556.

B) Selectively remove processed traffic from one or more Queues (e.g., $Q_1$ 538→$Q_n$ 542) for return to a PE (e.g., $PE_1$ 524→$PE_n$ 530).

C) Selectively deposit incoming traffic (e.g., traffic received from a PE [e.g., $PE_1$ 524→$PE_n$ 530]) on one or more TSs (e.g., $TS_0$ 552→$TS_n$ 554) on a CCH 550.

D) Selectively remove traffic from one or more TSs (e.g., $TS_0$ 552→$TS_n$ 554) on a CCH 550 for return to a PE (e.g., $PE_1$ 524→$PE_n$ 530).

The catalog of SCD activities that was described above is illustrative only and it will be readily apparent to one of ordinary skill in the relevant art that numerous other activities are easily possible and indeed are fully within the scope of the present invention.

A PRSE Complex 556 may house a dynamically updateable set of one or more PRSEs ($PRSE_1$ 558→$PRSE_n$ 560 in the diagram).

A PRSE (e.g., $PRSE_1$ 558→$PRSE_n$ 560) may be workflow-based, with a dynamically updateable set of one or more workflows removing incoming traffic from a Queue (e.g., $Q_1$ 538→$Q_n$ 542), performing all of the required processing operations (explained below), and depositing processed artifacts on a Queue (e.g., $Q_1$ 538→$Q_n$ 542). Through flexible, extensible, and dynamically updatable configuration information a workflow component may be quickly and easily realized to support any number of activities. For example, workflows might be configured to remove an item from a Queue (e.g., $Q_1$ 538→$Q_n$ 542); deposit an item on a Queue (e.g., $Q_1$ 538→$Q_n$ 542); perform one or more lookup operations in support of traffic routing; implement aspects of a logical IMS plane; etc. The specific workflows that were just described are exemplary only and it will be readily apparent to one of ordinary skill in the relevant art that numerous other workflow arrangements, alternatives, etc. are easily possible.

Figure 7:
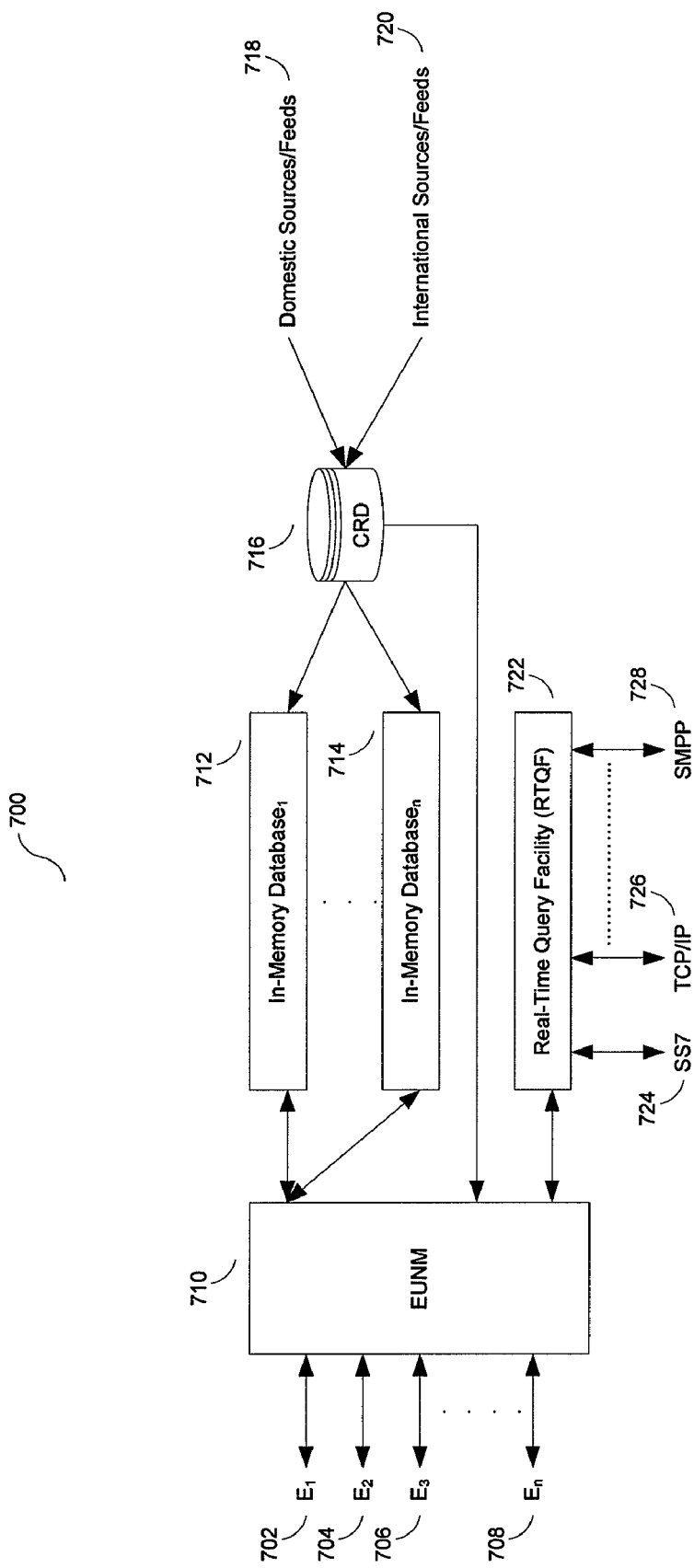
FIG. 7 illustrates elements of an exemplary routing facility.

A PRSE (e.g., $PRSE_1$ 558→$PRSE_n$ 560) may leverage a comprehensive, flexible, scalable, etc. lookup facility (indicated, albeit at a very high level, as Routing Data 564 in the diagram) to support, possibly inter alia, its traffic routing operations. Such a lookup facility may provide authoritative answers to inquiries like "At this moment in time what carrier services the Telephone Number (TN) 1-703-555-1212?", "What entity services the SIP addresss sip: john.doe@bigcompany.com?", etc. Among other things such a lookup facility may address (1) the complexities that are associated with all of the different TN numbering plans, schemes, etc. that exist around the world; (2) the complexities that arise with worldwide Mobile Number Portability (MNP) regimes; etc. A more detailed depiction of such a lookup facility is presented in FIG. 7 and reference numeral 700. Such a lookup facility may consist of, possibly inter alia:

A) An Electronic Numbering (ENUM) façade 710 through which various

PRSEs ($E_1$ 702→$E_n$ 708 in the diagram) may connect, submit routing inquiries, receive routing responses, etc.

B) A dynamically updateable set of one or more In-Memory Databases (In-Memory $Database_1$ 712→In-Memory $Database_n$ 714 in the diagram) that optionally house or host selected data (including, possibly inter alia, data from a Composite Routing Database [CRD] 716) to provide, as one example, optimal performance.

C) A Real-Time Query Facility (RTQF) 722 through which inquiries may be dispatched real-time to authoritative bodies (such as, for example, TN assignment administrators) around the world. A RTQF 722 may support multiple communication channels, paradigms, protocols, etc. (such as, possibly inter alia, SS7 724, TCP/IP 726, UDP/IP, SMPP 728, etc.).

D) A CRD 716 containing comprehensive routing information for, possibly inter alia, TNs within all of the different TN numbering plans, schemes, etc. that exist around the world. A CRD 716 may receive updates (e.g., dynamically, on a scheduled basis, etc.) from any number of sources or feeds including, possibly inter alia, domestic 718 (such as, for example, from a Local Exchange Routing Guide [LERG], from one or more Number Portability Administration Centers [NPACs], etc.) and international 720 (such as, for example, from Hong Kong, from the United Kingdom, etc.).

With reference again to FIG. 5, the catalog of PRS processing activities that was described above is illustrative only and it will be readily apparent to one of ordinary skill in the relevant art that numerous other processing steps are easily possible and indeed are fully within the scope of the present invention.

4) Persistence 568. A Database (DB) Complex 570 may house a dynamically updateable set of one or more DBs ($DB_1$ 572→$DB_n$ 576 in the diagram). A DB (e.g., $DB_1$ 572→$DB_n$ 576) may contain a range of data or information including, possibly inter alia, Transaction Detail Records (TDRs, which may capture elements or aspects of all of the traffic is processed by $IMS_X$); selected details of all administrative, processing, etc. activities; etc.

A Data Warehouse (DW) Complex 580 may house a dynamically updateable set of one or more DWs ($DW_1$ 582→$DW_n$ 586 in the diagram). A DW (e.g., $DW_1$ 582→$DW_n$ 586) may be fed by, possibly inter alia, a suite of flexible, extensible, and dynamically updatable Extraction-Transformation-Loading (ETL), Universal Rating Engine (URE, described further below), etc. facilities 578 that may pull data or information from, possibly among other sources, one or more DBs (e.g., $DB_1$ 572→$DB_n$ 576).

The DBs (e.g., $DB_1$ 572→$DB_n$ 576) and DWs (e.g., $DW_1$ 582→$DW_n$ 586) that are depicted are logical representations of the possibly multiple physical repositories that may be implemented to support, inter alia, configuration, word catalog, calculation, etc. information. The physical repositories may be implemented through any combination of conventional Relational Database Management Systems (RDBMSs) such as Sybase or Oracle, through Object Database Management Systems (ODBMSs), through in-memory Database Management Systems (DBMSs), through specialized data repositories, or through any other equivalent facilities.

5) Administration 588. An Administrator 590 may provide management for or 'command and control' over all of the different $IMS_X$ elements through, as one example, a Web-based interface. It will be readily apparent to one of ordinary skill in the relevant art that numerous other interfaces (e.g., data feed, Application Programming Interface [API], etc.) are easily possible.

Additionally, an Administrator may provide access to the body of flexible, extensible, and dynamically updateable configuration information that all of the different $IMS_X$ elements rely upon.

An Administration layer or tier may provide comprehensive reporting facilities 592. Such reporting facilities may leverage, possibly inter alia, one or more DBs (e.g., $DB_1$ 572→$DB_n$ 576) and/or one or more DWs (e.g., $DW_1$ 582→$DW_n$ 586) to generate scheduled (e.g., hourly, daily, weekly, etc.) and/or on-demand reporting with report results delivered (to, for example, a MS or a WC or a MICV or others) through Short Message Service (SMS)/Multimedia Message Service (MMS)/IMS/etc. messages; through Electronic Mail (E-Mail); through Instant Messenger (IM); through a World Wide Web (WWW)-based facility; through an Interactive Voice Response (IVR) facility; via File Transfer Protocol [FTP]; through an API; etc. Generated reports may contain, possibly inter alia, textual and graphic elements.

The specific $IMS_X$ layer or tier arrangement that was described above is illustrative only and it will be readily apparent to one of ordinary skill in the relevant art that numerous other arrangements are easily possible and indeed are fully within the scope of the present invention.

Beyond providing basic IMS support and services $IMS_X$ may offer, among other things, additional (e.g., value-add) features and functions such as, possibly inter alia:

1) Billing. Support for a comprehensive array of billing (e.g., rating, etc.) activities. Such billing activities may leverage a URE to flexibly and dynamically rate events (where an event may include, possibly inter alia, some aspect of incoming traffic, some activity by a PRSE, etc.). A URE may evaluate any number of items as it rates an event, including for example:

A) One or more TDRs.

B) One or more charging models, pricing plans, etc. (that may consider, possibly inter alia, origination [such as, for example, carrier, TN, SIP address, etc.], destination [such as, for example, carrier, TN, SIP address, etc.], surcharges and discounts, date, day of week, time, volume, etc.).

C) One or more flexible, extensible, and dynamically configurable Point in Transaction (PiT) hooks. At a PiT hook one or more processing actions (e.g., a calculation, a call out to an external system, etc.) may be completed.

A URE may preserve the results of a rated event in, possibly inter alia, one or more TDRs.

2) Support for public and private IP addresses.

3) Support for, possibly inter alia, IP Version 4 (IPv4) and IP Version 6 (IPv6).

4) Support for variable Quality of Service (QoS) levels each level having, possibly inter alia, different cost/charging paradigms. For example, different QoS levels may be established for different classes of traffic, etc.—e.g., one QoS level for voice traffic (such as VoIP), another QoS level for interactive video, another QoS level for streaming video, another QoS level for image and text exchanges (through vehicles such as SMS and MMS), etc.

5) Filtering. Support for, possibly inter alia, zero, one, or multiple Black List and/or White List artifacts; malware (e.g., virus) detection; spam detection; etc. Each filtering option may have, possibly inter alia, one or more cost/charging paradigms.

6) Sandbox. The ability to create one or more 'sandboxes' or 'experimentation areas' wherein an entity (such as, for example, a carrier) may conduct controlled development activities, perform testing, complete evaluation efforts, conduct demonstrations, etc. A sandbox option may have, possibly inter alia, one or more cost/charging paradigms.

7) Augmentation. Support for the selective addition, insertion, etc. in to the processed traffic of:

A) Informational elements—e.g., a service announcement, a relevant or applicable factoid, etc. An informational element may be selected statically (e.g., the same informational text is used), selected randomly (e.g., informational text is randomly selected from a pool of available informational text), or location-based (i.e., informational text is selected from a pool of available informational text based on the current physical location of a source and/or recipient [e.g., a MS' WD] as derived from, as one example, a Location-Based Service [LBS] or similar facility).

B) Advertising content—e.g., textual material, multimedia (images of brand logos, sound, video snippets, etc.) material, etc. containing advertisements, promotional materials, coupons, etc. The advertising material may be selected statically (e.g., the same advertising material is used), selected randomly (e.g., advertising material is randomly selected from a pool of available material), or location-based (i.e., advertising material is selected from a pool of available material based on the current physical location of a source and/or recipient [e.g., a MS' WD] as derived from, as one example, a LBS or similar facility). $IMS_X$ may optionally allow advertisers to register and/or provide (e.g., directly, or through links/references to external sources) advertising content.

It is important to note that the hypothetical example that was presented above, which was described in the narrative and which was illustrated in the accompanying figures, is exemplary only and was presented for purposes of illustration and description. It is not intended to be exhaustive or to limit the invention to the specific forms disclosed. It will be readily apparent to one of ordinary skill in the relevant art that numerous alternatives, variations, modifications, etc. to the presented example are easily possible and, indeed, are fully within the scope of the present invention.

The following list defines acronyms as used in this disclosure.

| Acronym | Meaning |
| --- | --- |
| API | Application Programming Interface |
| AS | Application Server |
| CCH | Cross Complex Highway |
| CRD | Composite Routing Database |
| CSCF | Call Session Control Function |
| DB | Database |
| DBMS | Database Management System |
| DSL | Digital Subscriber Line |
| DW | Data Warehouse |
| E-Mail | Electronic Mail |
| ENUM | Electronic Numbering |
| ETL | Extraction, Transformation, Loading |
| FMC | Fixed Mobile Convergence |
| FTP | File Transfer Protocol |
| HSS | Home Subscriber Server |
| IM | Instant Messenger |
| IMS | IP Multimedia Subsystem |
| IMSx | IMS Exchange |
| IP | Internet Protocol |
| IPv4 | IP Version 4 |
| IPv6 | IP Version 6 |
| IVR | Interactive Voice Response |
| LBS | Location-Based Service |
| LERG | Local Exchange Routing Guide |
| MG | Media Gateway |
| MICV | Messaging Inter-Carrier Vendor |
| MMS | Multimedia Message Service |
| MNP | Mobile Number Portability |
| MS | Mobile Subscriber |
| NGN | Next Generation Networking |
| NPAC | Number Portability Administration Center |
| ODBMS | Object Database Management System |
| PE | Protocol Engine |
| PiT | Point in Transaction |
| PLMN | Public Land Mobile Network |
| PRS | Processing, Routing, Switching |
| PRSE | PRS Engine |
| PSTN | Public Switched Telephone Network |
| Q | Queue |
| QoS | Quality of Service |
| RDBMS | Relational Database Management System |
| RTQF | Real-Time Query Facility |
| SC | Switching Complex |
| SCD | SC Director |
| SIP | Session Initiation Protocol |

-continued

| Acronym | Meaning |
|---|---|
| SMPP | Short Message Peer-to-Peer |
| SMS | Short Message Service |
| SP | Service Provider |
| SS7 | Signaling System Number 7 |
| 3GPP | Third Generation Partnership Project |
| TCP | Transmission Control Protocol |
| TDR | Transaction Detail Record |
| TN | Telephone Number |
| TS | Technical Slot |
| UDP | User Datagram Protocol |
| UE | User Equipment |
| URE | Universal Rating Engine |
| VoIP | Voice Over IP |
| WC | Wireless Carrier |
| WD | Wireless Device |
| WWW | World Wide Web |

What is claimed is:

1. An intermediary system for interconnecting multiple IP Multimedia Subsystem (IMS) networks, comprising:
a protocol engine complex having at least one input unit selectably connectable to a first IMS network from which a message is received;
said protocol engine complex having at least one output unit selectably connectable to a second IMS network through which said message can reach a destination address;
a process, routing, and switching (PRS) complex operable to manipulate aspects of, and alter at least a portion of, said message received from said input unit and sent to said output unit; and
a switching complex director operable to selectably deposit incoming traffic from said protocol engine complex on one or more queues for subsequent processing by said PRS complex, and selectably operable to remove processed traffic from said one or more queues for return to said protocol engine complex,
wherein said PRS complex performs a routing operation based on a destination address of said message.

2. The system of claim 1, wherein said input unit and said output unit span one or more of IP Multimedia Subsystem logical planes including a Services Plane, a Control Plane, and a Network or Transport Plane.

3. The system of claim 1, wherein said routing operation includes accessing a composite routing database.

4. The system of claim 3, wherein said composite routing database is accessed through an ENUM façade.

5. The system of claim 3, wherein said composite routing database is populated through one or more of domestic data feeds, international data feeds, and a real-time query facility.

6. The system of claim 3, wherein said manipulation includes the creation of one or more records.

7. The system of claim 1, wherein said manipulation includes the creation of one or more transaction detail records.

8. The system of claim 7, wherein said transaction detail records are preserved.

9. The system of claim 1, wherein said PRS complex performs at least one protocol transformation.

10. The system of claim 1, wherein said destination address is one or more of a telephone number, a short code, or a Session Initiation Protocol address.

11. A method for interconnecting multiple IP Multimedia Subsystem (IMS) networks, comprising:
receiving, at a protocol engine complex, a message from a first IMS network;
passing the message to a switching complex director operable to selectably deposit incoming traffic from said protocol engine complex on one or more queues for subsequent processing by a process, routing and switching PRS complex, and selectably operable to remove processed traffic from said one or more queues for return to said protocol engine complex;
performing, at said PRS complex, one or more processing steps on said message, including at least the completion of a routing operation based on the destination address of said message, and yielding a processed message; and
sending said processed message to a second IMS network from a same IMS exchange system that received the first IMS message.

12. The method of claim 11, wherein said message receiving and said message sending span one or more of IP Multimedia Subsystem logical planes including a Services Plane, a Control Plane, and a Network or Transport Plane.

13. The method of claim 11, wherein said routing operation comprises accessing a composite routing database.

14. The method of claim 13, wherein said composite routing database is accessed through an ENUM façade.

15. The method of claim 13, wherein said composite routing database is populated through one or more of domestic data feeds, international data feeds, and a real-time query facility.

16. The method of claim 11, wherein said processing steps include the creation of one or more transaction detail records.

17. The method of claim 16, wherein said transaction detail records are preserved.

18. The system of claim 11, wherein said destination address is one or more of a telephone number, a short code, or a Session Initiation Protocol address.

19. An intermediary system for interconnecting multiple IP Multimedia Subsystem (IMS) networks, comprising:
a first Protocol Engine (PE) in communication with and receiving an incoming message from a first IMS network, said first PE transforming said incoming message from a first format, said first format being applicable to said first IMS network, to a second format, said second format being native to said intermediary system;
a second PE in communication with and sending an outgoing message to a second IMS network, said second PE transforming said outgoing message from said second format to a third format, said third format being applicable to said second IMS network;
a process, routing, and switching (PRS) complex operable to manipulate aspects of, and alter at least a portion of, said incoming message yielding said outgoing message; and
a switching complex director operable to selectably deposit incoming traffic from said first PE on one or more queues for subsequent processing by said PRS complex, and selectably operable to remove processed traffic from said one or more queues for return to said second PE,
wherein said manipulation includes at least the completion of a routing operation based on a destination address of said incoming message.

20. The system of claim 19, wherein said first PE and said second PE span one or more of IP Multimedia Subsystem logical planes including a Services Plane, a Control Plane, and a Network or Transport Plane.

21. The system of claim 19, wherein said switching complex, for said routing operation, accesses a composite routing database.

22. The system of claim 21, wherein said composite routing database is accessed through an ENUM façade.

23. The system of claim 21, wherein said composite routing database is populated through one or more of domestic data feeds, international data feeds, and a real-time query facility.

24. The system of claim 19, wherein said manipulation includes the creation of one or more transaction detail records.

25. The system of claim 24, wherein said transaction detail records are preserved.

26. The system of claim 19, wherein said destination address is one or more of a telephone number, a short code, or a Session Initiation Protocol address.

* * * * *